Feb. 28, 1933. S. A. JEFFRIES 1,899,333
GEAR SHIFTING MECHANISM
Filed Sept. 3, 1929 4 Sheets-Sheet 1

INVENTOR
SCHUYLER A. JEFFRIES
BY
ATTORNEYS

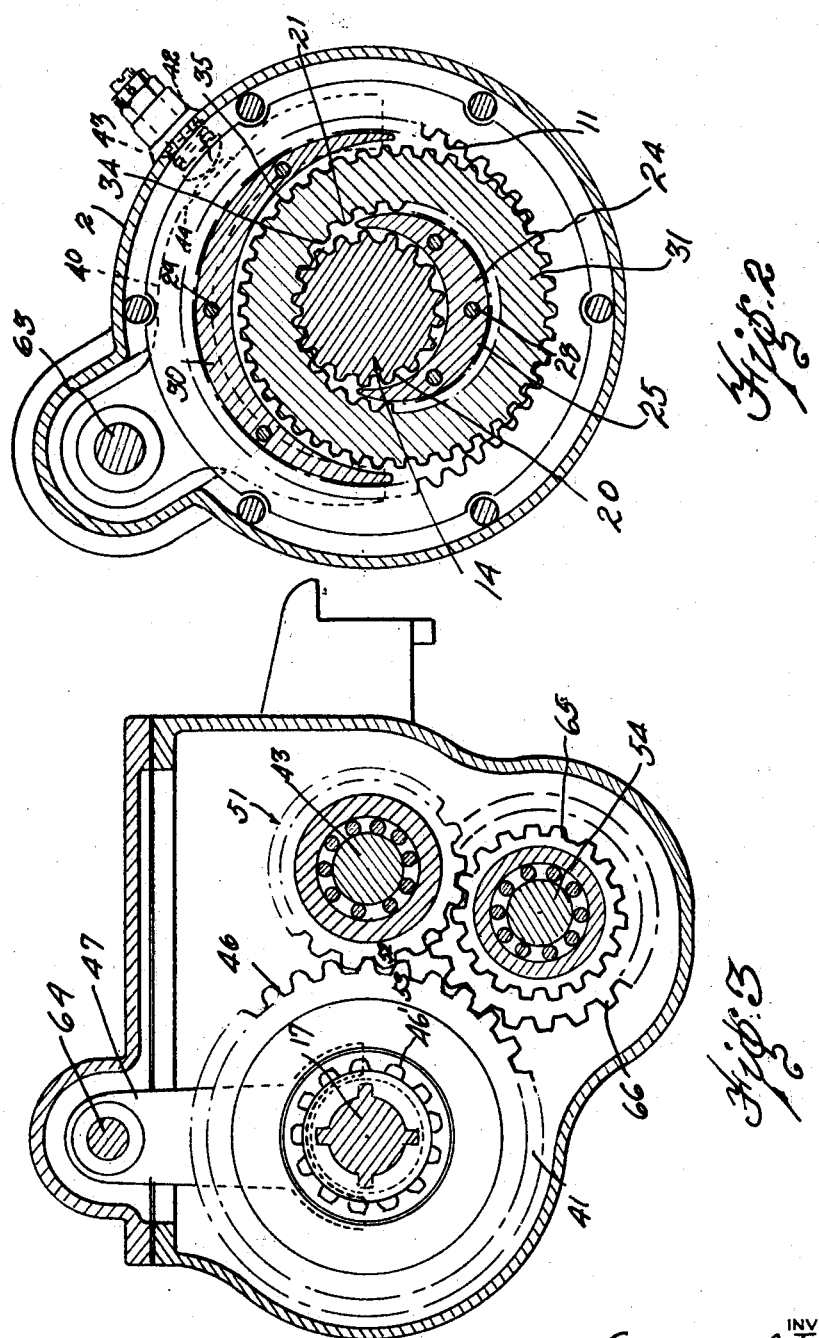

Feb. 28, 1933.     S. A. JEFFRIES     1,899,333
GEAR SHIFTING MECHANISM

Filed Sept. 3, 1929     4 Sheets-Sheet 3

INVENTOR
SCHUYLER A. JEFFRIES

ATTORNEYS

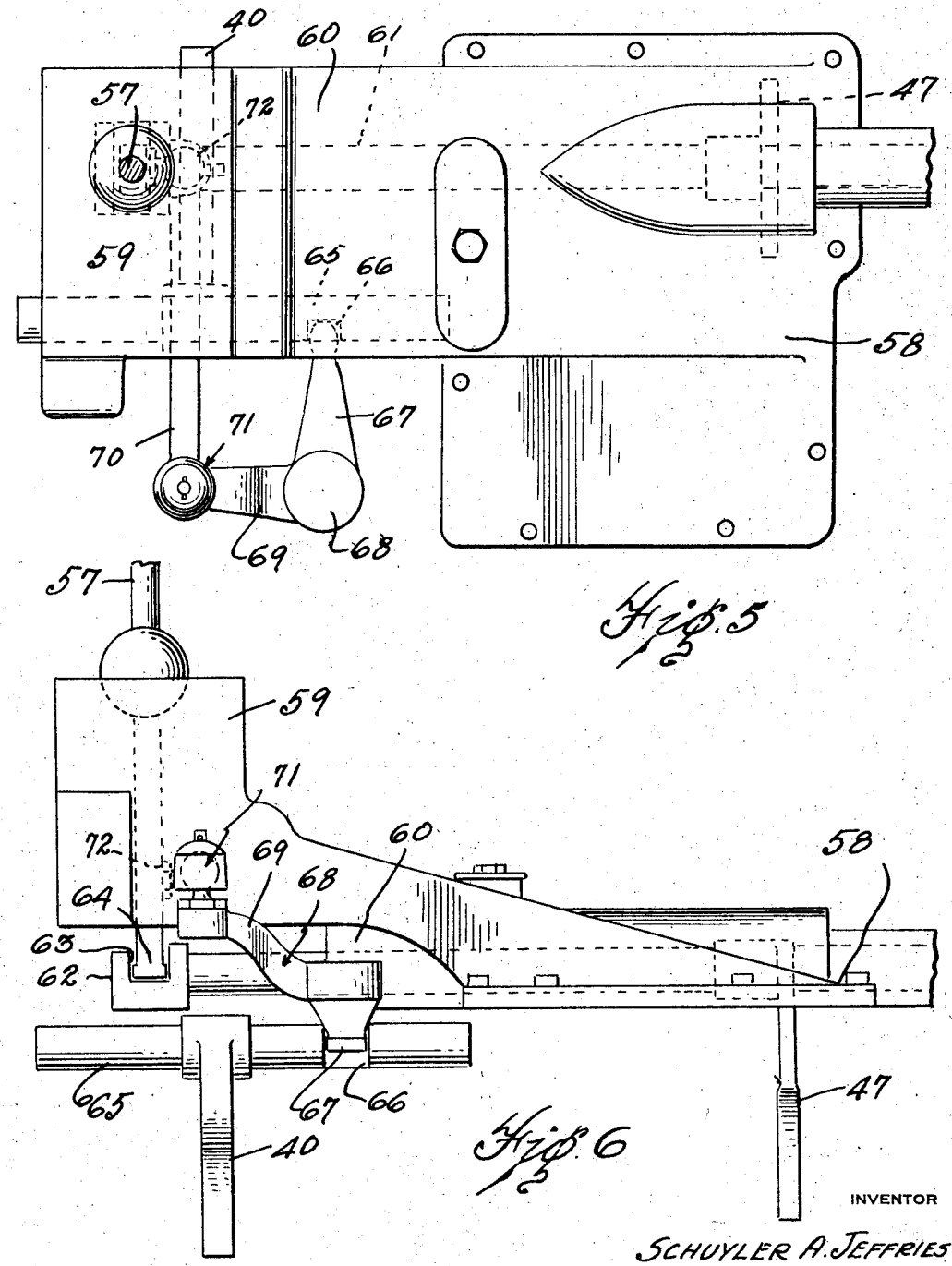

Patented Feb. 28, 1933

1,899,333

UNITED STATES PATENT OFFICE

SCHUYLER A. JEFFRIES, OF LANSING, MICHIGAN, ASSIGNOR TO REO MOTOR CAR COMPANY, OF LANSING, MICHIGAN, A CORPORATION OF MICHIGAN

GEAR SHIFTING MECHANISM

Application filed September 3, 1929. Serial No. 390,095.

This invention relates generally to transmissions and has particular reference to variable speed transmissions of the shiftable gear type.

It is the primary object of this invention to provide an improved gear shifting mechanism which is not only simple in construction and operation, but which is extremely satisfactory for use in connection with transmissions having four or more speed changes.

With the foregoing, as well as other objects in view, the invention resides in the peculiar construction of the gear shifting mechanism and the manner in which the same cooperates with the shiftable gears in the transmission for actuating the same. In the drawings:

Figure 2 is a transverse sectional view taken on the plane indicated by the line 2—2 of Figure 1.

Figure 3 is another transverse sectional view taken on the plane indicated by the line 3—3 of Figure 1.

Figure 5 is a top plan view of the gear shifting mechanism.

Figure 6 is a side elevational view partly in section of the mechanism shown in Figure 5.

Figure 1:
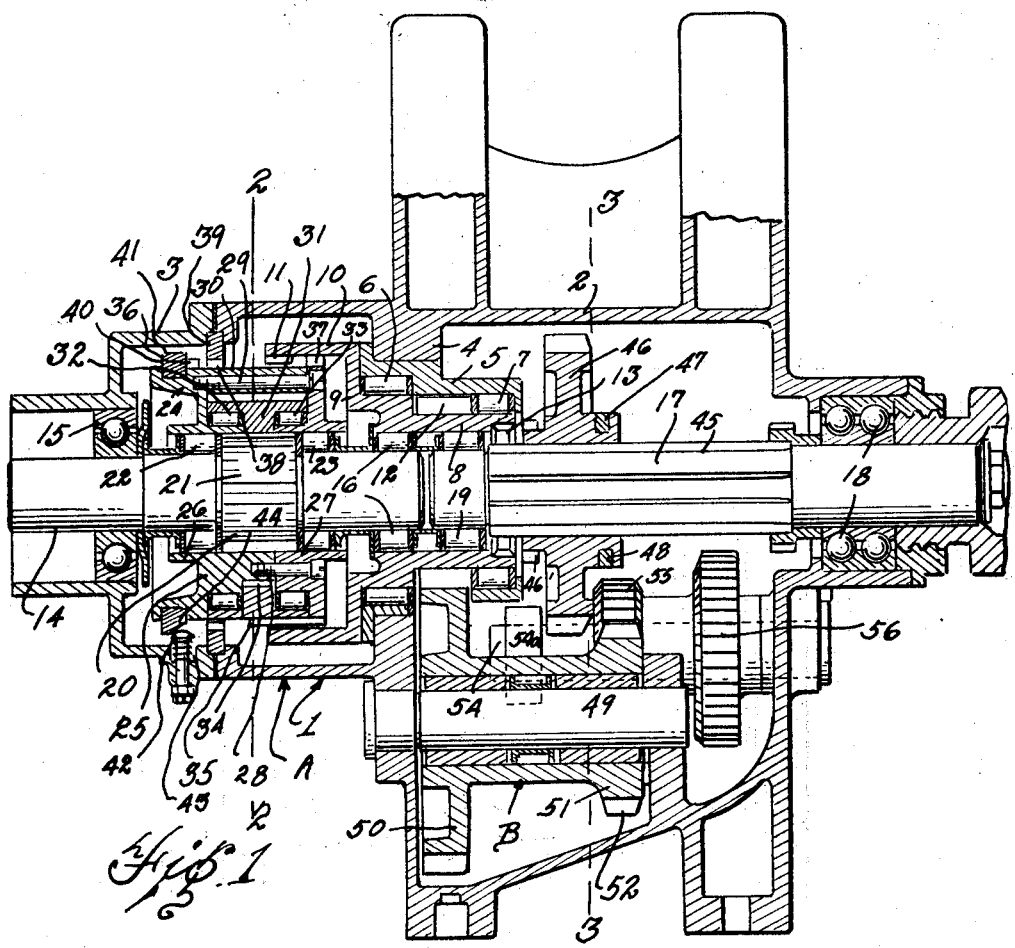
Figure 1 is a longitudinal sectional view through a transmission for which my improved shifter mechanism is especially designed.

While my improved gear shifting mechanism may be used in connection with various types of selective gear transmissions, nevertheless it finds particular utility when used in connection with a transmission of the type illustrated and described herein. This transmission is provided with four forward speeds of different ratios and two reverse speeds and is composed essentially of two units, A and B, the first unit containing an arrangement permitting either a direct drive or a forward drive at reduced speed and the second unit being arranged to provide a direct connection, a forward gear drive and a reverse gear drive. The unit B is preferably controlled by one shifter fork while unit A is actuated through a separate shifter fork. Both units are preferably mounted in a transmission case and so arranged as to constitute a single transmission mechanism having a driving shaft at one end thereof and a driven shaft at the other end and are adapted to be controlled by a single lever.

The transmission case 1 is preferably made up in two pieces, the rear housing 2 and the forward housing 3. At the forward end of the rear housing there is an inwardly projecting portion of the casing designated as 4 in which is inserted a bushing 5 for receiving the annular roller bearings 6 and 7 respectively, these bearings supporting the central rotatable member 8. The member 8 is provided at its forward end with a radial flange 9 having the longitudinally projecting annular flange 10 connected thereto, the latter being provided with internal gear teeth 11. The member 8 also has formed thereon preferably intermediate the bearings 6 and 7, the external gear teeth 12 and at its rear end is provided with the internal clutch teeth 13.

14 is the driving shaft of the transmission journaled in the ball bearings 15 at the front end of the transmission case and extending through the forward housing 3 and having the rear end thereof journaled in the roller bearings 16 arranged in the hollow interior of the rotatable member 8. 17 is the driven shaft journaled in the ball bearings 18 in the rear of the transmission case and extending through the rear housing 2 in axial alignment with the driving shaft 14 and having its forward end journaled in the roller bearings 19 also arranged within the hollow interior of the rotatable member 8.

The driving shaft 14 has external teeth 20 thereon forming a drive pinion 21 and on each side there are the roller bearings 22 and 23 respectively for rotatably mounting the member 24 which has formed thereon the eccentric 25. The member 24 is preferably made up of two parts 26 and 27 secured together by the screws 28 and 29, the latter serving also to secure a counterweight 30 to the member 24 in such a position to balance the weight of the eccentric portion 25. 31 is the eccentric gear rotatably mounted on the eccentric portion of the member 24 by the roller bearings 32 and 33 and having formed on its inner periphery the internal gear teeth 34 and having also the external gear teeth 35. The internal teeth of the eccentric 31 mesh with the teeth 20 of the pinion 21 while the external teeth 35 are arranged to mesh with the internal teeth 11 of the annular flange 10 at a point diametrically opposite from the point of meshing with the internal teeth 34. Thus, if the eccentric member 24 is held from rotative movement the driving of the pinion 21 will rotate the annular flange 10 at reduced speed through the eccentric gear 31.

On the periphery of the eccentric member 24 there are arranged at opposite ends thereof the clutch teeth 36 and 37, the former being preferably formed integral with the end portion of the member 26 and the latter integral with the other end portion of the member 27. The teeth 37 are adapted to mesh with the internal teeth 11 while the teeth 36 are adapted to mesh with corresponding teeth 38 on a fixed ring 39 secured to the transmission housing 3. 40 is a shifting fork engaging a recess 41 in the eccentric member 24 and adapted to shift said member longitudinally upon the roller bearings 22 and 23 while maintaining at all times the engagement of the pinion 21 with the eccentric gear 31. When the eccentric 24 is in the rearward position the clutch teeth 36 engage the clutch teeth 38 and thus lock the eccentric member 24 to the transmission case, thereby preventing any rotation. On the other hand, when the eccentric 24 is moved forwardly the external teeth 37 engage the internal teeth 11 thereby coupling the eccentric 24 to the rotatable member 8 and in this position the eccentric 24, eccentric 31 and rotatable member 8 all rotate as a unit and form a direct drive.

In order to stop rotation of the eccentric 24 before the same is clutched to the ring 39, a braking mechanism is provided comprising the brake shoe 42 extending radially inward of the transmission case. This brake shoe is urged inwardly by the coil spring 43 and engages with the cam surface 44 on the shifting fork 40. This fork is allowed to rotate on its shaft so the clearance between 40 and 25 is taken up when the shifting fork 40 is moved rearwardly. Thus the brake shoe 42 engaging the cam 44 stops the rotation of the eccentric 24 before engaging the clutch teeth 36 with the fixed clutch teeth 38.

The driven shaft 17 is provided with splines 45 on which is slidably mounted a spur gear 46 having external clutch teeth 46′ thereon adapted to engage the internal clutch teeth 13 when the gear is in the forward position. 47 is the shifting fork engaging a recess 48 in the hub of the gear 46 and serving to move said gear longitudinally on the splines. 49 is a countershaft parallel to the driven shaft 17 and having rotatably mounted thereon the spur gear 50 constantly meshing with the gear teeth 12. 51 is another gear mounted on the countershaft and preferably formed integral with the gear 50, this latter gear having the teeth 52 adapted to mesh with the teeth on the gear 46 when the latter is moved rearwardly on the splines of the driven shaft. There is also provided a stub shaft 54 in a bearing 54a, said shaft having a reverse idler gear 55 rotatably mounted thereon and arranged to run in constant mesh with the gear 51 on the countershaft 49. The stub shaft 54 also has secured thereto in spaced relation to the idler 55 a reverse gear 56 adapted to mesh with the gear 41 to effect a reverse drive. In this connection it will be noted from Figure 1 of the drawings that the reverse gear 56 is spaced rearwardly from the low gear 51 so that when reverse speed is desired the gear 41 is slid rearwardly through the low speed teeth 52 on the gear 51 into mesh with the reverse gear 56.

In the transmission as described above, the units A and B are preferably controlled by separate shifting forks and by suitably arranging the forks there are available six different speeds, four forward and two reverse. The direct drive is obtained when the eccentric 24 is clutched to the member 8, this being the forward position of the eccentric with the external teeth 37 engaging internal teeth 11. The gear 46 is also in the forward position, thus directly connecting the member 8 with the driven shaft 17 by the engagement of internal clutch teeth 13 with the external clutch teeth 46′.

The second speed of the transmission is obtained by leaving the gear 46 directly coupled to the member 8 and moving the eccentric rearwardly to disengage the same from the clutch teeth 11 and couple it to the fixed ring 39. With this arrangement a reduction is obtained by reason of the fact that the drive goes through the eccentric gear 31.

The third forward speed is obtained by shifting the gear 46 into engagement with the gear 51, thus driving the driven shaft 17 by means of the constant meshed gears 12 and 50 and the change gears 51 and 46. For the third speed the unit A again has the eccentric 24 coupled to the member 8 while for the fourth speed, the eccentric is coupled to the fixed ring 39.

As stated above, the reverse speeds are obtained by shifting the gear 46 rearwardly through the low speed teeth 52 into mesh with the reverse speed gear 56, thus rotating the driven shaft 17 oppositely to the driving shaft 14. It will be noted that two reverse gear ratios are possible, one when the unit A is clutched in one position and the other when said unit is arranged in the other position.

Figure 4:
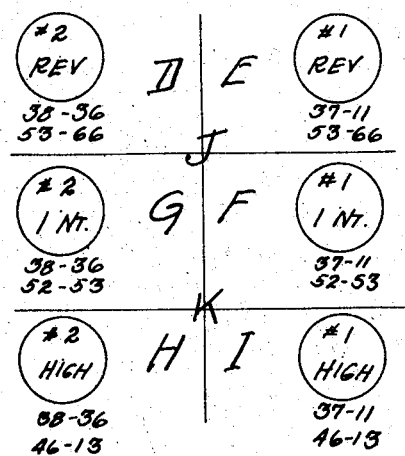
Figure 4 is a chart showing the different hand lever positions with the corresponding gear combinations.
Figure 7:
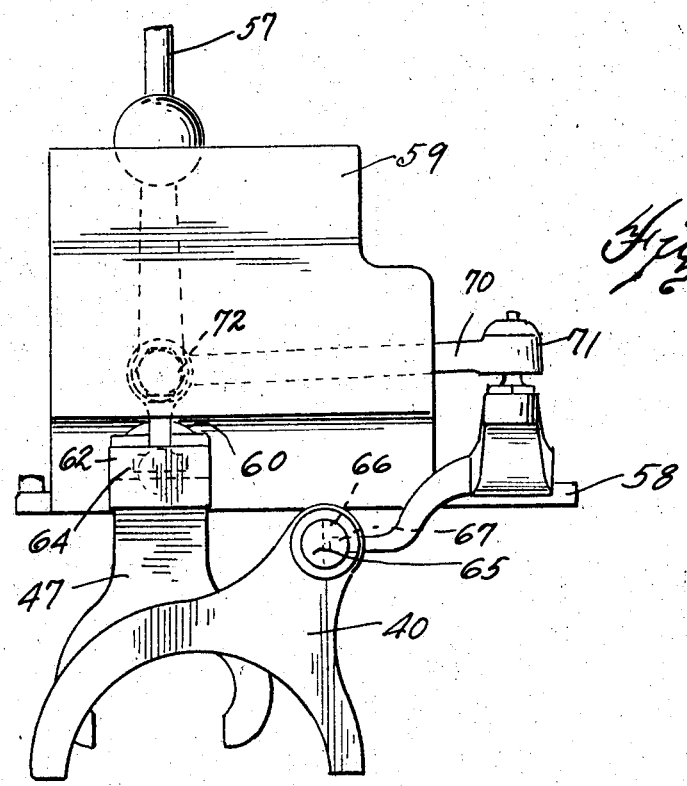
Figure 7 is an end elevational view of the construction shown in Figure 5.

The various speeds possible with the present transmission and the manner in which they are secured may be more readily understood by reference to Figure 4 which shows a chart illustrating diagrammatically the various speed changes. From this chart it will be apparent that when the gear shift control lever 57 is moved into zone D on the chart, the gears 38 and 36 of unit A will be brought into mesh and the gears 53 and 56 of unit B will be brought into mesh, thus giving a specially low reverse, or in other words, second reverse. On the other hand, if the lever is moved into zone E, the gears 37 and 11 of unit A will be brought into mesh while the gears 53 and 56 of unit B will be undisturbed or maintained in mesh. This produces a slightly higher reverse speed and for the purpose of convenience may be called first reverse. If first intermediate is desired, the lever 57 may be moved rearwardly into the zone F wherein the gears 37 and 11 of unit A are maintained in mesh and the gears 52 and 53 of unit B will be moved into engagement thus producing a relatively high intermediate. If it is desired to operate the vehicle at lower speed, the lever 57 may be moved into zone G wherein gears 52 and 53 of unit B are retained in mesh but gears 37 and 11 are moved out of mesh and gears 38 and 36 into mesh, thus producing a second or lower intermediate speed. In the event it is desired to move directly into high from second intermediate, the lever 57 may be moved into zone H wherein gears 38 and 36 are retained in mesh and gears 46 and 13 of unit B moved into mesh thereby producing a second high, or in other words, a relatively low high speed. When higher speed is desired, the lever 57 may be moved into zone I during which operation gears 38 and 36 are moved out of mesh and 37 and 11 of unit A into mesh, gears 46 and 13 being retained in mesh upon movement from second high to first high. When the gear shift lever 57 is moved to a position intermediate the zones, or in other words moved to any point on the lines J and K, the transmission is in neutral position. Thus from the foregoing, it will be apparent that movement of the control lever forward and rearwardly controls the gears in unit B while movement of the control lever from one side to the other controls the gears in unit A. While in describing the operation of the transmission a particular sequence of operations has been referred to, it should be understood that the construction is such as to permit the control lever to be moved into any one of the zones aforesaid without following any specified sequence.

For actuating the various gears in each of the units A and B to effect the foregoing combinations, I provide the following mechanism: Secured to the top of the transmission housing is a plate 58 having a portion 59 forming a universal mounting for the lever 57 and having another portion 60 forming a journal for the longitudinally slidable shifter rail 61. The shifter rail 61 is connected intermediate the ends thereof to the gear shifter fork 47 and is provided at the forward end thereof with an enlarged portion 62 having a recess 63 therein extending transversely of the rail 61. The recess 63 is of sufficient dimension to receive the lower end 64 of the control lever 57 and permit movement of the end 64 transversely of the rail 61. The arrangement is such that the lower end 64 of the control lever is retained in the recess 63 at all times. Spaced laterally from the shifter rail 61 is a second shifter rail 65 secured to the shifter fork 40 and having a recess 66 therein adapted to receive the end of one arm 67 of a bell crank lever 68. The bell crank lever is pivoted in any suitable manner upon the transmission case and has the other arm 69 thereof universally connected to a link 70 by means of the ball and socket joint illustrated generally at 71. The free end of the link 70 is preferably universally connected as at 72 to the control lever 57 slightly above the end 64 thereof.

Thus from the foregoing it will be apparent that a movement of the control lever 57 in an axial direction of the rail 61 will effect a sliding movement of the latter to produce a corresponding movement of the shifter fork 47 for actuating the gears within unit B of the transmission. On the other hand, when the control lever is rocked in a direction transversely to the direction aforesaid, the shifter rail 65, together with the fork 40, will be moved through the bell crank and link connection hereinbefore discussed to effect an operation of the gears within unit A of the transmission. When, however, the control lever is moved in a direction diagonally to both the directions above mentioned, both the shifter rails 61 and 65 will be operated with the result that both units A and B will be actuated to effect the different speed combinations.

What I claim as my invention is:

1. A variable speed transmission having in combination, a pair of units comprising gears to be meshed, and actuating mechanism for the gears including a control element movable in one direction to engage the gears in one of said units to effect different speed combinations and in another direction transverse to the direction aforesaid for engaging the gears in the other of said units to obtain still other gear combinations and further movable in a direction transverse to both the directions aforesaid to control the gears in both of said units.

2. A variable speed transmission having in combination a plurality of independent units each comprising a plurality of shiftable members, and operating mechanism for the members including a control element movable in one direction to actuate the members in one of the units and in another direction transverse to the aforesaid direction for actuating the members in another of the units and still in another direction transverse to both of the aforesaid directions to actuate the members in both of said units.

3. A variable speed transmission having in combination, a plurality of independent units, each comprising shiftable members, operating mechanism for the members comprising, a rail mounted for sliding movement in the direction of its axis and operatively connected to a shiftable member in one of said units for actuating the same, a second rail substantially parallel to the rail aforesaid and mounted for sliding movement in the direction of its axis and operatively connected to a shiftable member in the other of said units for actuating the same, a universally mounted control lever having one end operatively connected to one of the aforesaid rails whereby rocking movement of the control lever in the direction of the axis of the latter rail effects a sliding movement of the same in a corresponding direction, linkage connecting the control lever to the other of said rails whereby movement of the control lever in a direction transverse to the direction of rocking movement aforesaid thereof actuates the latter rail without interfering with the first-named rail and whereby rocking movement of the control lever in a direction transverse to both the aforesaid directions effects a sliding movement of both of said rails to actuate the members in both units.

In testimony whereof I affix my signature.

SCHUYLER A. JEFFRIES.